United States Patent
Imada et al.

(10) Patent No.: US 10,577,992 B2
(45) Date of Patent: Mar. 3, 2020

(54) MICROWAVE HEATING APPARATUS AND EXHAUST GAS PURIFICATION APPARATUS

(71) Applicant: FUJITSU LIMITED, Kawasaki-shi, Kanagawa (JP)

(72) Inventors: Tadahiro Imada, Kawasaki (JP); Katsusada Motoyoshi, Sagamihara (JP); Tatsuya Hirose, Yokohama (JP); Yoichi Kawano, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 369 days.

(21) Appl. No.: 15/471,109

(22) Filed: Mar. 28, 2017

(65) Prior Publication Data
US 2017/0292420 A1    Oct. 12, 2017

(30) Foreign Application Priority Data

Apr. 12, 2016  (JP) ................ 2016-079489

(51) Int. Cl.
*H05B 6/64* (2006.01)
*F01N 3/028* (2006.01)
*H05B 6/80* (2006.01)

(52) U.S. Cl.
CPC ............ *F01N 3/028* (2013.01); *H05B 6/645* (2013.01); *H05B 6/647* (2013.01); *H05B 6/80* (2013.01)

(58) Field of Classification Search
CPC ...... F01N 3/028; F01N 3/202; F01N 2240/16; H05B 6/6411; H05B 6/645; H05B 6/6447; H05B 6/6455; H05B 6/6458; H05B 6/647; H05B 6/6491; H05B 6/664; H05B 6/68; H05B 6/681; H05B 6/70; H05B 6/704;

(Continued)

(56) References Cited

U.S. PATENT DOCUMENTS

| 6,403,939 B1* | 6/2002 | Fagrell ............. B01J 19/0046 219/679 |
| 2014/0073065 A1* | 3/2014 | Ohno ............ H01L 21/67248 219/716 |
| 2017/0135163 A1* | 5/2017 | Chang ............. H01L 21/67115 |

FOREIGN PATENT DOCUMENTS

| JP | 5-263622 | 10/1993 |
| JP | 06-307224 | 11/1994 |

(Continued)

OTHER PUBLICATIONS

JPOA—Office Action dated Dec. 24, 2019 issued with respect to the Japanese Patent Application No. 2016-079489 with full machine translation.

*Primary Examiner* — Hung D Nguyen
(74) *Attorney, Agent, or Firm* — Fujitsu Patent Center

(57) ABSTRACT

A disclosed microwave heating apparatus includes a casing part configured to accommodate an object to be heated; a microwave generator configured to generate a microwave; an electromagnetic wave generator configured to generate an electromagnetic wave whose frequency is different from that of the microwave; an electromagnetic wave sensor configured to measure power of the electromagnetic wave, the power of the electromagnetic wave being measured after the electromagnetic wave incident on the casing part from the electromagnetic wave generator has passed through the object to be heated; and a controller configured to control, based on the power measured in the electromagnetic wave sensor, the microwave generator to generate the microwave.

19 Claims, 4 Drawing Sheets

(58) Field of Classification Search
CPC ........ H05B 6/705; H05B 6/707; H05B 6/708;
H05B 6/78; H05B 6/80; H05B 6/806
USPC ....... 219/678, 679, 680, 690, 695, 702, 715,
219/716, 717, 721, 746, 747, 748, 750,
219/756, 761, 762, 757
See application file for complete search history.

(56) References Cited

FOREIGN PATENT DOCUMENTS

| | | |
|---|---|---|
| JP | 7-83022 | 3/1995 |
| JP | 07-145720 | 6/1995 |
| JP | 09-112249 | 4/1997 |
| JP | 10-220219 | 8/1998 |
| JP | 2006-140063 | 6/2006 |
| JP | 2009-57948 | 3/2009 |
| JP | 2011-252387 | 12/2011 |
| WO | 2009/031600 A2 | 3/2009 |

* cited by examiner

MICROWAVE HEATING APPARATUS AND EXHAUST GAS PURIFICATION APPARATUS

CROSS-REFERENCE TO RELATED APPLICATIONS

This present application is based upon and claims the benefit of priority of the prior Japanese Patent Application No. 2016-079489, filed on Apr. 12, 2016, the entire contents of which are incorporated herein by reference.

FIELD

The present disclosure is related to a microwave heating apparatus and an exhaust gas purification apparatus.

BACKGROUND

At present, an exhaust gas purification apparatus using DPF (Diesel Particulate Filter) has been put to practical use as an apparatus for collecting fine particles such as PM (Particulate matter) contained in exhaust gas. In such an exhaust gas purification apparatus, the fine particles such as PM, etc., are deposited on the DPF by use, and thus it is required to regenerate the DPF. As a method for regenerating the DPF, for example, a method of using a high frequency electromagnetic wave such as a microwave, etc., emitted from a microwave heating apparatus is disclosed (for example, Patent Document 1). Specifically, according to the disclosed method, the DPF is regenerated by irradiating the DPF with an electromagnetic wave such as a microwave, etc., to heat fine particles such as PM, etc., accumulated in the DPF and burn the fine particles.

[Patent Document 1] Japanese Laid-open Patent Publication No. 2006-140063

[Patent Document 2] Japanese Laid-open Patent Publication No. 2011-252387

[Patent Document 3] Japanese Laid-open Patent Publication No. 10-220219

[Patent Document 4] Japanese Laid-open Patent Publication No. 9-112249

In the exhaust gas purification apparatus described above, the regeneration of the DPF is carried out, after the fine particulates such as PM, etc., have been accumulated in the DPF to some extent, by irradiating the DPF with electromagnetic waves such as microwaves, etc., which causes the fine particulates such as PM, etc., to be heated and oxidized and decomposed. However, since the DPF is covered by a casing, it is unknown from the outside whether or not fine particles such as PM, etc., have been accumulated in the DPF.

For this reason, for example, a method of judging a regeneration timing of the DPF and performing the regeneration using a regeneration timing judgment map for estimating the regeneration timing based on a relationship between intensity of the microwave detected by a microwave sensor and an operation time of an internal combustion engine (For example, Patent Document 3). However, according to the method disclosed in Patent Document 3, since the regeneration timing of the DPF is estimated from the intensity of the microwave and the operation time of the internal combustion engine, the regeneration timing may not be correctly detected in some cases. If the regeneration timing of the DPF is not correctly detected, such problems that the microwave is radiated at an unnecessary timing, the DPF is not regenerated even after the fine particulates such as PM, etc., have been accumulated in the DPF, etc., occur.

Further, according to the method disclosed in Patent Document 3, it is necessary to prepare the regeneration timing judgment map and the like, and it is necessary to memorize the regeneration timing judgment map and the like. Furthermore, according to the method disclosed in Patent Document 3, the control circuit for judging the regeneration timing also becomes complicated, and it takes time to implement the judgment, which leads to cost increase.

SUMMARY

According to one aspect of the disclosure, a microwave heating apparatus is provided, which includes:

a casing part configured to accommodate an object to be heated;

a microwave generator configured to generate a microwave;

an electromagnetic wave generator configured to generate an electromagnetic wave whose frequency is different from that of the microwave;

an electromagnetic wave sensor configured to measure power of the electromagnetic wave, the power of the electromagnetic wave being measured after the electromagnetic wave incident on the casing part from the electromagnetic wave generator has passed through the object to be heated; and a controller configured to control, based on the power measured in the electromagnetic wave sensor, the microwave generator to generate the microwave.

The object and advantages of the embodiment will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENTS

In the following, embodiments are described in detail with reference to appended drawings. It is noted that the same elements, etc., are given the same reference numbers, and an explanation thereof is emitted.

First Embodiment

[Microwave Heating Apparatus and Exhaust Gas Purification Apparatus]

Figure 1:
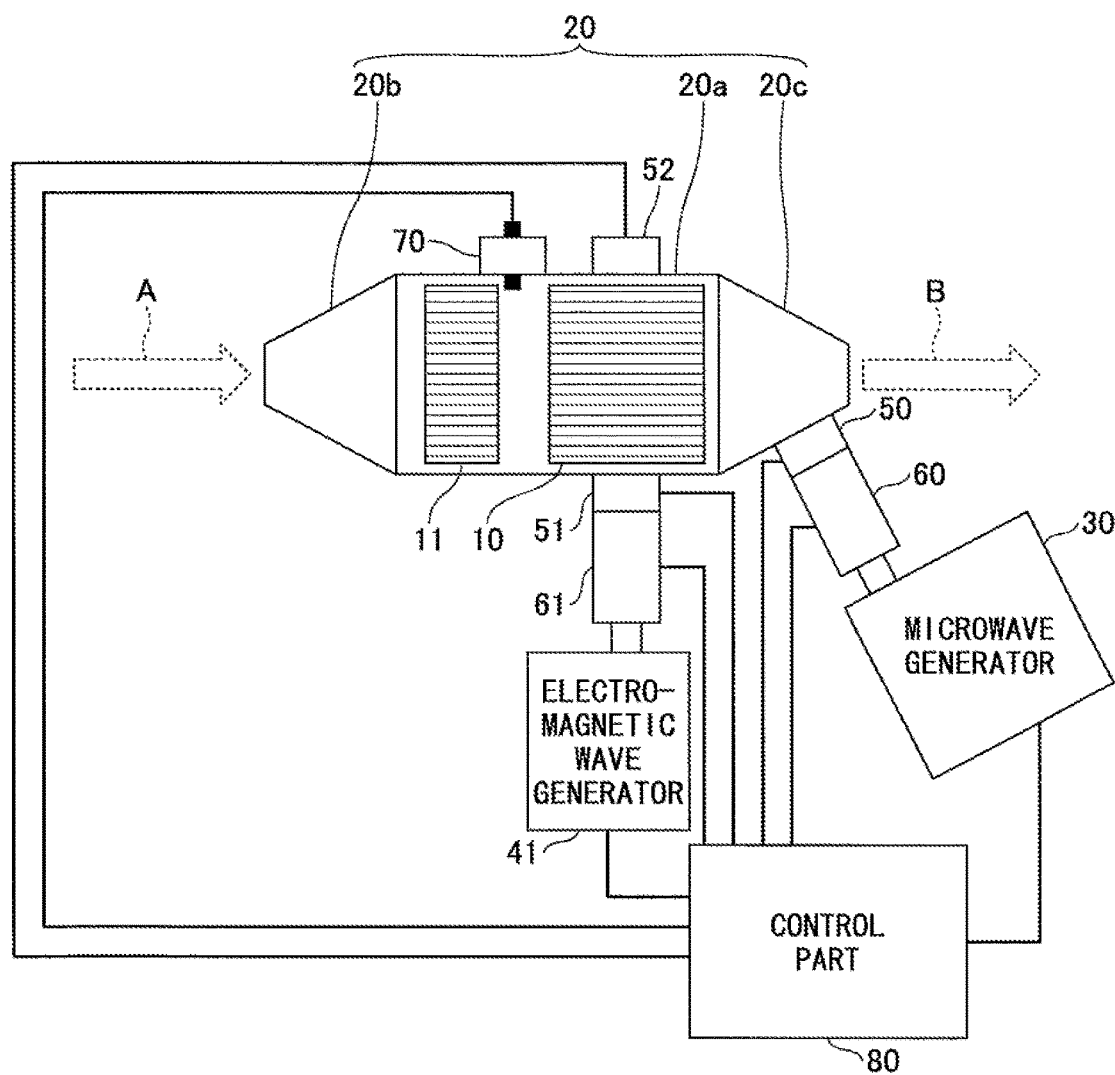
FIG. 1 is a diagram illustrating a structure of a microwave heating apparatus and an exhaust gas purification apparatus according to a first embodiment.

A microwave heating apparatus and an exhaust gas purification apparatus according to a first embodiment are explained with reference to FIG. 1. It is noted that the microwave heating apparatus according to the present embodiment is mounted on the exhaust gas purification apparatus according to the present embodiment.

The exhaust purification device according to the embodiment includes a fine particulate collection unit 10, an oxidation catalyst unit 11, a casing part 20, a microwave generator 30, an electromagnetic wave generator 41, a microwave sensor 50, a first electromagnetic wave sensor 51, a second electromagnetic wave sensor 52, a temperature measurement part 70, a control part 80, etc.

The fine particulate collection unit 10 serves as an object to be heated by the microwave heating apparatus in the present embodiment, and is formed of a DPF or the like. For example, the DPF is formed in a honeycomb structure in which adjacent vent holes are alternately closed, and the exhaust gas is discharged from the vent holes different from the vent holes for the inlet. The oxidation catalyst unit 11 is formed of an oxidation catalyst such as DOC (Diesel Oxidation Catalyst), etc.

The casing part 20 is formed of a metal material such as stainless steel and includes a casing body part 20a covering the periphery of the fine particulate collection unit 10 and the oxidation catalyst unit 11, an inlet port 20b and an outlet port 20c coupled to the casing body part 20a. In the exhaust gas purification apparatus according to the present embodiment, the exhaust for exhaust gas etc., from an engine etc., enters into the casing part 20 from the inlet port 20b from the direction indicated by the broken line arrow A, and passes through the oxidation catalyst unit 11 and fine particulate collection unit 10 provided in the casing body part 20a to be purified. Thereafter, the exhaust purified in the oxidation catalyst unit and the fine particulate collection unit 10 is discharged from the outlet port 20c in a direction indicated by a broken line arrow B.

In the casing part 20, the oxidation catalyst unit 11 and the fine particulate collection unit 10 are arranged in this order from the inlet port 20b toward the outlet port 20c. The oxidation catalyst unit 11 oxidizes the components contained in the exhaust gas entering through the inlet port 20b. For example, the oxidation catalyst unit 11 converts NO contained in the exhaust gas into $NO_2$ having stronger oxidizing power. In the fine particulate collection unit 10, fine particles such as PM, etc., are collected. In removing the collected fine particles such as PM, etc., by burning, the $NO_2$ generated in the oxidation catalyst unit 11 is used. The fine particulates such as PM, etc., collected in the fine particulate collection unit 10 are soot or the like, and contain a large amount of C (carbon). When burning and removing the fine particulates such as PM, etc., collected in the fine particulate collection unit 10, by flowing $NO_2$, C and $NO_2$ chemically react to produce $CO_2$. As a result, the fine particulates such as PM, etc., collected in the fine particulate collection unit 10 can be efficiently removed.

The microwave generator 30 is coupled to the casing part 20, and can generate microwaves of 2.45 GHz. In the microwave generator 30, in order to generate high power microwaves necessary for burning and removing fine particulates such as PM, etc., collected in the fine particulate collection unit 10, a semiconductor element formed of a nitride semiconductor is used. The microwave sensor 50 is provided between the casing part 20 and the microwave generator 30, and measures power (Pin0) of the incident wave incident on the casing part 20 from the microwave generator 30 and power (Pr0) of the reflected wave returning from the casing part 20. The power (P0) that is actually output from the microwave generator 30 into the casing part 20 is calculated from P0=Pin0−Pr0. Further, a tuner is provided between the microwave generator 30 and the microwave sensor 50. In the tuner 60, by reducing the power (Pr0) of the reflected wave, tuning is performed so as to increase the actually outputted power (P0).

The electromagnetic wave generator 41 is coupled to the casing part 20 and generates an electromagnetic wave having a different frequency from the microwave generated in the microwave generator 30. Since the electromagnetic wave radiated from the electromagnetic wave generator 41 is for detecting the amount of the fine particulates such as PM, etc., collected in the fine particulate collection unit 10, it is preferred that high frequency electromagnetic waves, which are easily absorbed by fine particulates such as PM, etc., are used. Specifically, the frequency of the electromagnetic wave radiated from the electromagnetic wave generator 41 is greater than or equal to 10 GHz and less than or equal to 10 THz. The first electromagnetic wave sensor 51 is provided between the casing part 20 and the electromagnetic wave generator 41, and measures power (Pin1) of the incident wave incident on the casing part 20 from the electromagnetic wave generator 41 and power (Pr1) of the reflected wave returning from the casing part 20. The power (P1) that is actually output from the electromagnetic wave generator 41 into the casing part 20 is calculated from P1=Pin1−Pr1. Further, a tuner 61 is provided between the first electromagnetic wave sensor 51 and the electromagnetic wave generator 41. In the tuner 61, by reducing the power (Pr1) of the reflected wave, tuning is performed so as to increase the actually outputted power (P1). It is noted that, since the wavelength of the microwave of 2.45 GHz is about 12 cm and the wavelength is relatively long, the microwave may not be absorbed so much depending on the position where fine particles such as PM, etc., exist, and a correlation between the amount of fine particles such as PM, etc., and the amount of microwaves absorbed is not very high. However, the electromagnetic waves of high frequency with short wavelengths are absorbed without substantial dependence on positions where the fine particles such as PM, etc., exist, etc. Therefore, a correlation between the amount of fine particles such as PM, etc., and the amount of microwaves absorbed can be increased.

The second electromagnetic wave sensor 52 is provided in the casing part 20 at a position where the second electromagnetic wave sensor 52 and the casing part 20 are opposed to each other with the fine particulate collection unit 10 interposed therebetween. The second electromagnetic wave sensor 52 measures power (P2) of the electromagnetic wave component transmitted through the fine particulate collection unit 10, among the electromagnetic wave components generated in the electromagnetic wave generator 41 and entering the casing part 20. The electromagnetic waves that have entered the casing part 20 are absorbed by the fine particulates such as PM, etc., accumulated in the fine particulate collection unit 10. Therefore, when the amount of particulates such as PM, etc., accumulated in the fine particulate collection unit is great, the amount of electromagnetic waves absorbed becomes great, and the power (P2) of electromagnetic waves measured by the second electromagnetic wave sensor 52 becomes low. Further, when the amount of particulates such as PM, etc., accumulated in the fine particulate collection unit 10 is small, the amount of electromagnetic waves absorbed becomes small, and the power (P2) of electromagnetic waves measured by the second electromagnetic wave sensor 52 becomes high.

According to the present embodiment, based on the power (P1) of the electromagnetic wave measured and calculated by the first electromagnetic wave sensor 51 and the power (P2) of the electromagnetic wave measured by the second electromagnetic wave sensor 52, it becomes possible to estimate an accumulated amount Mp of the fine particulates such as PM, etc., in the particulate collecting unit 10. Specifically, from an equation shown in the following (1), it is possible to estimate the accumulated amount Mp of the fine particulates such as PM, etc., in the fine particulate collection unit 10. It is noted that k and a are coefficients.

$$Mp = k \times \ln(P1/(a \times P2)) \quad \text{(equation 1)}$$

The temperature measurement part 70 is attached to the casing part 20 and measures a temperature of the fine particulate collection unit 10 in the casing part 20. The temperature measurement part 70 may be a radiation thermometer or the like that is capable of measuring the temperature distribution in the fine particulate collection unit 10. The control part 80 performs control of the exhaust gas purification apparatus according to the present embodiment.

Figure 2:
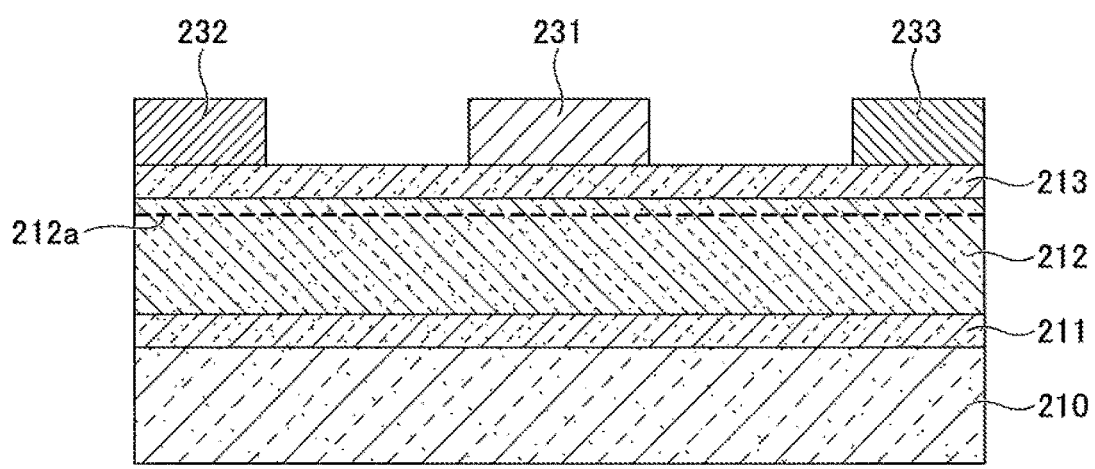
FIG. 2 is a diagram illustrating a structure of a semiconductor device used for a microwave generator.

In the present embodiment, a semiconductor element, specifically, a HEMT using a nitride semiconductor, or the like, is used in the microwave generator 30 in order to generate high power microwaves. As illustrated in FIG. 2, the HEMT using the nitride semiconductor is formed by laminating a nitride semiconductor layer on a substrate 210 such as SiC, etc. That is, a buffer layer 211 formed of AlN, GaN or the like, an electron transit layer 212, and an electron supply layer 213 are deposited in this order on the substrate 210. The electron transit layer 212 is formed of GaN, and the electron supply layer 213 is formed of AlGaN or InAlN. As a result, in the electron transit layer 212, a 2DEG 212*a* is generated in the vicinity of the interface with the electron supply layer 213. A gate electrode 231, a source electrode 232, and a drain electrode 233 are formed on the electron supply layer 213.

[Control of Microwave Heating Apparatus and Exhaust Purification Apparatus]

Figure 3:
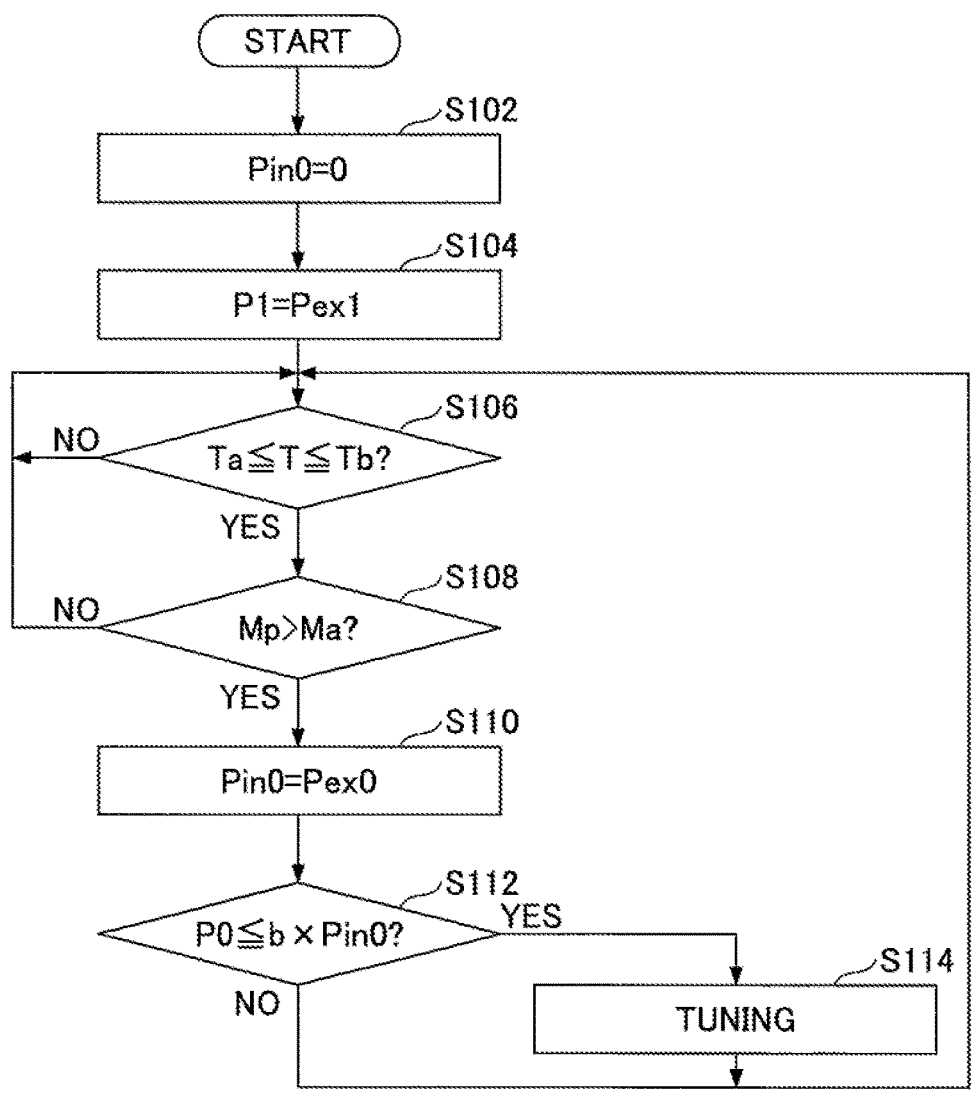
FIG. 3 is a flowchart of a control way of the exhaust gas purification apparatus according to the first embodiment.

Next, control of the microwave heating apparatus and the exhaust purification apparatus according to the present embodiment is explained with reference to FIG. 3. It is noted that the control of the microwave heating apparatus and the exhaust gas purification apparatus in the present embodiment is performed by the control part 80.

At first, in step 102 (S102), the power of the microwave generated in the microwave generator 30 is set to zero. Specifically, the power (Pin 0) of the incident wave incident on the casing part 20 from the microwave generator 30 is set to zero. When the power (Pin0) of the incident wave incident on the casing part 20 from the microwave generator 30 is already 0, the current state is kept.

Next, in step 104 (S104), the electromagnetic wave generator 41 generates the electromagnetic wave and sets the power (P1) actually output from the electromagnetic wave generator 41 into the casing part 20 to a predetermined power (Pex1).

Next, in step 106 (S106), the temperature measurement part 70 measures the temperature T of the fine particulate collection unit 10, and it is determined whether the temperature T measured by the temperature measurement part 70 is in a temperature range greater than or equal to a temperature Ta and less than or equal to a temperature Tb. When the temperature T is within the temperature range greater than or equal to the temperature Ta and less than or equal to the temperature Tb, the process proceeds to step 108. When the temperature T is not within the temperature range greater than or equal to the temperature Ta and less than or equal to the temperature Tb, step 106 is repeated. In the case where the temperature T of the fine particulate collection unit 10 is less than the temperature Ta, the temperature does not become a desired temperature even if the fine particulate collection unit 10 is irradiated with the microwaves, and thus the fine particulate collection unit 10 cannot be regenerated. When the temperature T of the fine particulate collection unit 10 is greater than the temperature Tb, the fine particulate collection unit 10 is regenerated without irradiating the microwave. For this reason, it is determined whether the temperature T of the fine particulate collection unit 10 is within the temperature range of not less than the temperature Ta and not more than the temperature Tb.

Next, in step 108 (S108), it is determined whether the accumulation amount Mp of the fine particulates such as PM, etc., in the fine particulate collection unit 10 exceeds a predetermined accumulation amount Ma. This is because it is unnecessary to perform the regeneration of the fine particulate collection unit when the accumulation amount Mp of the fine particulates such as PM, etc., in the fine particulate collection unit 10 does not exceed the predetermined accumulation amount Ma. When the accumulation amount Mp of the fine particulates such as PM, etc., in the fine particulate collection unit 10 exceeds the predetermined accumulation amount Ma, the process proceeds to step 110, and if the accumulation amount Mp is less than the predetermined accumulation amount Ma, the process proceeds to step 106. The accumulation amount Mp of the fine particulates such as PM, etc., in the fine particulate collection unit 10 is measured by measuring the electromagnetic wave generated in the electromagnetic wave generator 41 with the first electromagnetic wave sensor 51 and the second electromagnetic wave sensor 52, and applying the obtained power P1 and P2 to the above-mentioned equation (1).

Next, in step 110 (S110), the microwave is generated in the microwave generation unit 30, and the power (Pin0) of the incident wave incident on the casing part 20 from the microwave generator 30 is set to a predetermined power (Pex0). As a result, the regeneration of the fine particulate collection unit 10 is started.

Next, in step 112 (S 112), it is determined whether or not the power (P0) actually output from the microwave generator 30 into the casing part 20 is less than or equal to b×Pin0. It is noted that b is a coefficient. In the case where the power (P0) actually output from the microwave generator 30 into the casing part 20 is equal to or less than b×Pin0, the proportion of the reflected wave (Pr0) of the microwave is large, and thus the tuning to decrease Pr0 in the tuner 60 is necessary. When the power (P0) actually output from the microwave generator 30 to the casing part is equal to or less than b×Pin0, the process proceeds to step 114. When the power (P0) actually output from the microwave generator 30 to the casing part 20 exceeds b×Pin0, the process proceeds to step 106.

Next, in step 114 (S 114), the tuning to decrease Pr0 is performed in the tuner 60. After the tuning is performed in the tuner 60, the process proceeds to step 106.

It is noted that, in the present embodiment, in the case where it is not necessary to consider the reflected wave of the electromagnetic wave generated in the electromagnetic wave generator or in the case where there is hardly any reflected wave, a single electromagnetic wave sensor corresponding to the second electromagnetic wave sensor 52 may be provided without providing the first electromagnetic wave sensor 51.

A case where the exhaust gas purification apparatus in the present embodiment was mounted in a diesel engine with a displacement of 3 L and traveled in an urban area for 8 hours was examined. In this case, according to the experience of the inventor, it is presumed that the accumulation amount of the fine particles such as PM, etc., in the fine particulate collection unit 10 can be reduced to ⅓ as compared with an exhaust gas purification apparatus that is not equipped with the microwave heating apparatus. In addition, the microwave heating apparatus according to the present embodiment can also be used in a food heating apparatus for heating foods, a chemical reaction apparatus, etc.

Second Embodiment

Next, a second embodiment is described. According to the present embodiment, there are a microwave heating apparatus and an exhaust gas purification apparatus in which a plurality of electromagnetic wave generators are provided. The microwave heating apparatus and the exhaust purification apparatus according to the second embodiment are explained with reference to FIG. 4.

Figure 4:
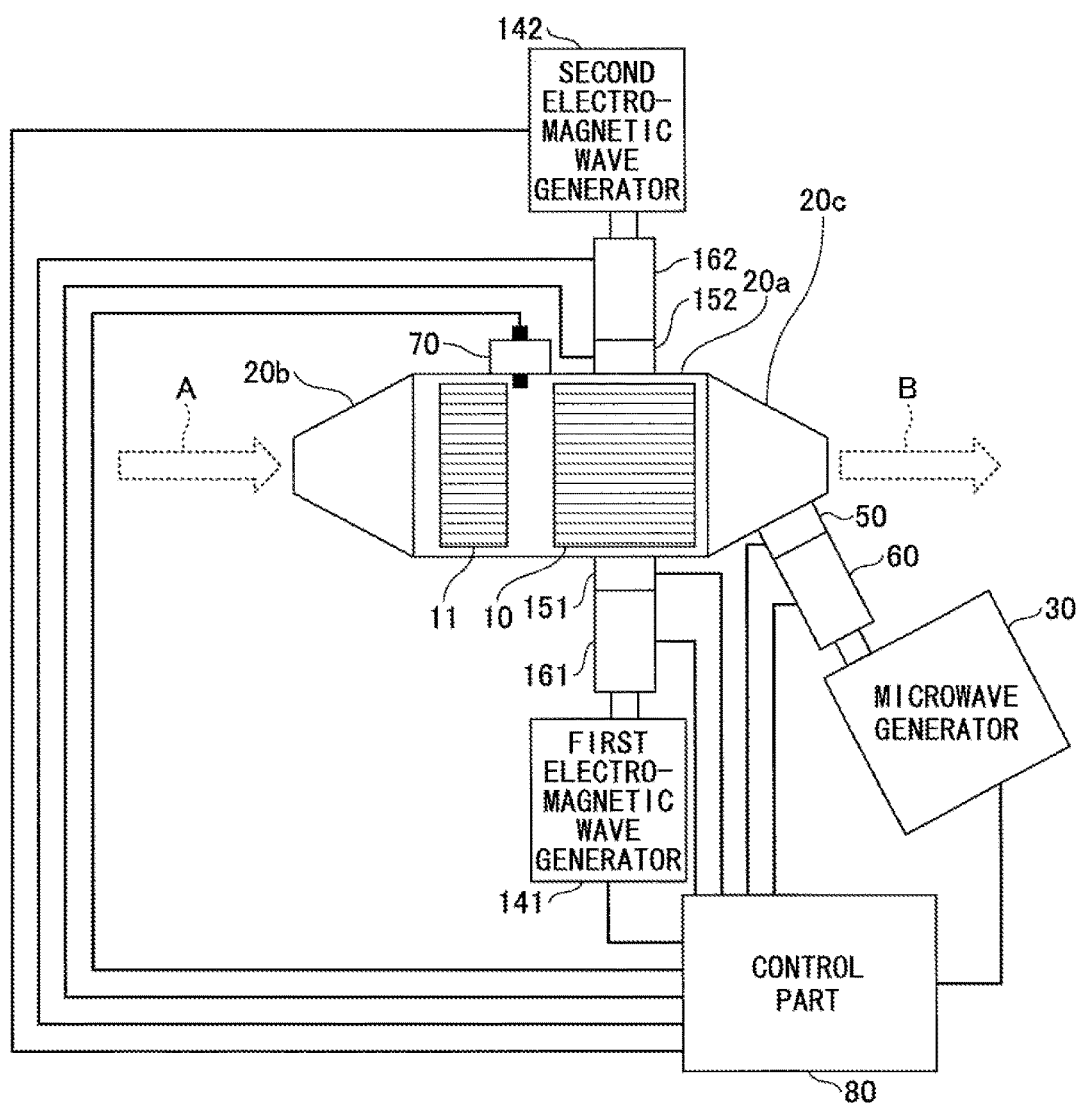
FIG. 4 is a diagram illustrating a structure of a microwave heating apparatus and an exhaust gas purification apparatus according to a second embodiment.

As illustrated in FIG. 4, the exhaust gas purification apparatus according to the present embodiment includes a first electromagnetic wave generator 141, a second electromagnetic wave generator 142, a first electromagnetic wave sensor 151, a second electromagnetic wave sensor 152, etc. It is noted that, similar to the exhaust gas purification apparatus according to the first embodiment, the exhaust gas purification apparatus in the present embodiment includes the fine particulate collection unit 10, the oxidation catalyst unit 11, the casing part 20, the microwave generator 30, the microwave sensor 50, the temperature measurement part 70, the control part 80, etc.

The first electromagnetic wave generator 141 and the second electromagnetic wave generator 142 in the embodiment are the same as the electromagnetic wave generator 41 according to the first embodiment, and the frequency of the generated electromagnetic waves may be different or the same. Like the first electromagnetic wave sensor 51 and the second electromagnetic wave sensor 52 in the first embodiment, the first electromagnetic wave sensor 151 and the second electromagnetic wave sensor 152 are attached to the casing part 20 at positions where the first electromagnetic wave sensor 151 and the second electromagnetic wave sensor 152 are opposed to each other via the fine particulate collection unit 10.

A tuner 161 is provided between the first electromagnetic wave generator 141 and the first electromagnetic wave sensor 151, and a tuner 162 is provided between the second electromagnetic wave generator 142 and the second electromagnetic wave sensor 152. The tuner 161 and the tuner 162 have the same function as the tuner 61 in the first embodiment. Specifically, the tuner 161 performs the tuning such that the reflected wave of the electromagnetic wave generated in the first electromagnetic wave generator 141 becomes low, and the tuner 162 performs the tuning such that the reflected wave of the electromagnetic wave generated in the second electromagnetic wave generator 142 becomes low.

In the present embodiment, the first electromagnetic wave sensor 151 measures the incident wave and the reflected wave of the electromagnetic wave generated in the first electromagnetic wave generator 141, and measures the electromagnetic wave entering the casing part 20 from the second electromagnetic wave generator 142 and transmitted through the fine particulate collection unit 10. Further, the second electromagnetic wave sensor 152 measures the incident wave and the reflected wave of the electromagnetic wave generated in the second electromagnetic wave generator 142, and measures the electromagnetic wave entering the casing part 20 from the first electromagnetic wave generator 141 and transmitted through the fine particulate collection unit 10.

The control unit 80 calculates, based on the information obtained by the first electromagnetic wave sensor 151 and the second electromagnetic wave sensor 152, the accumulation amount Mp of the fine particulates such as PM, etc., accumulated in the fine particulate collection unit 10. In the present embodiment, by providing a plurality of electromagnetic wave generators, it is possible to more accurately calculate the accumulated amount Mp of the fine particulates such as PM, etc., accumulated in the fine particulate collection unit 10.

In the exhaust gas purification apparatus according to the present embodiment, the first and second electromagnetic wave sensors corresponding to the first electromagnetic wave generator 141 and the second electromagnetic wave generator 142 may be individually provided. Specifically, a first electromagnetic wave sensor and a second electromagnetic wave sensor corresponding to the first electromagnetic wave generator 141 and a first electromagnetic wave sensor and a second electromagnetic wave sensor corresponding to the second electromagnetic wave generator 142 may be provided. In this case, there are four electromagnetic wave sensors in total.

In the present embodiment, when the electromagnetic wave generated in the first electromagnetic wave generator 141 and the electromagnetic wave generated in the second electromagnetic wave generator 142 are different from each other in the frequency, electromagnetic waves can be continuously generated. When the electromagnetic wave generated in the first electromagnetic wave generator 141 and the electromagnetic waves generated in the second electromagnetic wave generator 142 have the same frequency, the timings of generating the electromagnetic waves may be shifted to alternately generate the electromagnetic waves.

It is noted that the contents other than the above are the same as those in the first embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:
1. A microwave heating apparatus, comprising:
a casing part configured to accommodate an object to be heated;
a microwave generator configured to generate a microwave;
an electromagnetic wave generator configured to generate an electromagnetic wave whose frequency is different from that of the microwave;
an electromagnetic wave sensor configured to measure power of the electromagnetic wave, the power of the electromagnetic wave being measured after the electromagnetic wave incident on the casing part from the electromagnetic wave generator has passed through the object to be heated; and a controller configured to control, based on the power measured in the electromagnetic wave sensor, the microwave generator to generate the microwave.

2. The microwave heating apparatus of claim 1, wherein the electromagnetic wave generated by the electromagnetic wave generator has the frequency higher than that of the microwave.

3. The microwave heating apparatus of claim 1, wherein the electromagnetic wave generated by the electromagnetic wave generator has the frequency greater than or equal to 10 GHz and less than or equal to 10 THz.

4. The microwave heating apparatus of claim 3, wherein the electromagnetic wave generated by the electromagnetic wave generator has the frequency higher than that of the microwave.

5. The microwave heating apparatus of claim 3, wherein the electromagnetic wave generated by the electromagnetic wave generator has the frequency greater than or equal to 10 GHz and less than or equal to 10 THz.

6. The microwave heating apparatus of claim 3, further comprising one or more of the electromagnetic wave generators, the electromagnetic wave generators being provided separately.

7. The microwave heating apparatus of claim 3, further comprising a temperature measurement part configured to measure a temperature of the object to be heated, wherein
the controller performs control of the microwave generator to generate the microwave in a state in which the temperature measured by the temperature measurement part is within a predetermined range.

8. The microwave heating apparatus of claim 3, further comprising:
a microwave sensor configured to measure power of an incident component of the microwave incident on the casing part, and power of a reflected component of the microwave reflected at the casing part, and
a tuner configured to perform, based on the power of the incident wave and the power of the reflected component measured by the microwave sensor, tuning to reduce the power of the reflected component.

9. The microwave heating apparatus of claim 3, wherein the microwave generator includes a semiconductor element formed of a nitride semiconductor.

10. The microwave heating apparatus of claim 1, further comprising one or more of the electromagnetic wave generators, the electromagnetic wave generators being provided separately.

11. The microwave heating apparatus of claim 1, further comprising a temperature measurement part configured to measure a temperature of the object to be heated, wherein
the controller performs control of the microwave generator to generate the microwave in a state in which the temperature measured by the temperature measurement part is within a predetermined range.

12. The microwave heating apparatus of claim 1, further comprising:
a microwave sensor configured to measure power of an incident component of the microwave incident on the casing part, and power of a reflected component of the microwave reflected at the casing part, and
a tuner configured to perform, based on the power of the incident wave and the power of the reflected component measured by the microwave sensor, tuning to reduce the power of the reflected component.

13. The microwave heating apparatus of claim 1, wherein the microwave generator includes a semiconductor element formed of a nitride semiconductor.

14. A microwave heating apparatus, comprising:
a casing part configured to accommodate an object to be heated;
a microwave generator configured to generate a microwave;
an electromagnetic wave generator configured to generate an electromagnetic wave whose frequency is different from that of the microwave;
a first electromagnetic wave sensor configured to measure power of the electromagnetic wave incident on the casing part from the electromagnetic wave generator;
a second electromagnetic wave sensor configured to measure power of the electromagnetic wave, the power of the electromagnetic wave being measured after the electromagnetic wave incident on the casing part from the electromagnetic wave generator has passed through the object to be heated; and
a controller configured to control, based on the power of the electromagnetic wave measured in the first electromagnetic wave sensor and the power measured in the second electromagnetic wave sensor, the microwave generator to generate the microwave.

15. An exhaust gas purification apparatus, comprising:
a microwave heating apparatus including
 a casing part configured to accommodate an object to be heated,
 a microwave generator configured to generate a microwave,
 an electromagnetic wave generator configured to generate an electromagnetic wave whose frequency is different from that of the microwave,
 an electromagnetic wave sensor configured to measure power of the electromagnetic wave, the power of the electromagnetic wave being measured after the electromagnetic wave incident on the casing part from the electromagnetic wave generator has passed through the object to be heated, and
 a controller configured to control, based on the power measured in the electromagnetic wave sensor, the microwave generator to generate the microwave; and
a fine particle collecting part configured to collect fine particles included in exhaust gas, wherein
the fine particle collecting part is the object to be heated,
the casing part includes a casing body part, an inlet port and an outlet port for the exhaust gas, the casing body part covering the fine particle collecting part, the inlet port and the outlet port being coupled to the casing body part, and
the fine particle collecting part is radiated by the microwave from the microwave heating apparatus.

16. An exhaust gas purification apparatus, comprising:
a microwave heating apparatus including
 a casing part configured to accommodate an object to be heated,
 a microwave generator configured to generate a microwave,
 an electromagnetic wave generator configured to generate an electromagnetic wave whose frequency is different from that of the microwave,
 an electromagnetic wave sensor configured to measure power of the electromagnetic wave, the power of the electromagnetic wave being measured after the electromagnetic wave incident on the casing part from the electromagnetic wave generator has passed through the object to be heated, and a controller configured to control, based on the power measured in the electromagnetic wave sensor, the microwave generator to generate the microwave; and a fine particle collecting part configured to collect fine particles included in exhaust gas, wherein the fine particle collecting part is the object to be heated, the casing part includes a casing body part, an inlet port and an outlet port for the exhaust gas, the casing body part covering the fine particle collecting part, the inlet port and the outlet port being coupled to the casing body part, and the fine particle collecting part is radiated by the microwave from the microwave heating apparatus, the electromagnetic wave generated by the electromagnetic wave generator has the frequency greater than or equal to 10 GHz and less than or equal to 10 THz.

17. An exhaust gas purification apparatus, comprising:
a microwave heating apparatus including
    a casing part configured to accommodate an object to be heated,
    a microwave generator configured to generate a microwave,
    an electromagnetic wave generator configured to generate an electromagnetic wave whose frequency is different from that of the microwave,
    an electromagnetic wave sensor configured to measure power of the electromagnetic wave, the power of the electromagnetic wave being measured after the electromagnetic wave incident on the casing part from the electromagnetic wave generator has passed through the object to be heated, and a controller configured to control, based on the power measured in the electromagnetic wave sensor, the microwave generator to generate the microwave; and a fine particle collecting part configured to collect fine particles included in exhaust gas, wherein the fine particle collecting part is the object to be heated, the casing part includes a casing body part, an inlet and an outlet for the exhaust gas, the casing body part covering the fine particle collecting part, the inlet and the outlet being coupled to the casing body part, and the controller calculates, based on the power of the electromagnetic wave measured in the first electromagnetic wave sensor and the power measured in the second electromagnetic wave sensor, a stacked amount of the fine particles stacked in the fine particle collecting part, and performs control of the microwave generator to generate the electromagnetic wave in a state in which the calculated stacked amount is greater than or equal to a predetermined stacked amount.

18. The exhaust gas purification apparatus of claim 17, wherein the electromagnetic wave generated by the electromagnetic wave generator has the frequency greater than or equal to 10 GHz and less than or equal to 10 THz.

19. The exhaust gas purification apparatus of claim 17, further comprising a temperature measurement part configured to measure a temperature of the object to be heated, wherein the controller performs control of the microwave generator to generate the microwave in a state in which the temperature measured by the temperature measurement part is within a predetermined range.

\* \* \* \* \*